United States Patent [19]

Wolff, Sr. et al.

[11] Patent Number: 4,693,027

[45] Date of Patent: Sep. 15, 1987

[54] VARIABLE POWER FLAT SPRING FOR REVOLVER-TYPE FIREARMS

[75] Inventors: Walter C. Wolff, Sr.; Walter C. Wolff, Jr., both of Berwyn, Pa.

[73] Assignee: W. C. Wolff Company, Ardmore, Pa.

[21] Appl. No.: 759,468

[22] Filed: Jul. 26, 1985

[51] Int. Cl.$^4$ .................. F41C 1/00; F41C 19/00; F16F 1/00

[52] U.S. Cl. ................................ 42/59; 42/65; 267/158

[58] Field of Search .............. 267/47, 158, 159; 42/59, 65

[56] References Cited

U.S. PATENT DOCUMENTS

| | | | |
|---|---|---|---|
| 64,866 | 5/1867 | Henry | 267/47 |
| 315,921 | 4/1885 | Dye | 267/47 |
| 1,535,803 | 11/1920 | Benjamin | 267/47 |
| 1,730,700 | 10/1929 | Wallace | 267/47 |
| 3,452,974 | 7/1969 | Dixon | 267/47 |
| 3,705,718 | 12/1972 | Fukui et al. | 267/47 |

FOREIGN PATENT DOCUMENTS 573181  3/1959  Canada .................. 267/58

OTHER PUBLICATIONS

"Highway Patrolman ® Revolver Model No. 28" Smith & Wesson No. 5107A.

*Primary Examiner*—David H. Brown
*Assistant Examiner*—Michael J. Carone
*Attorney, Agent, or Firm*—Ratner & Prestia

[57] ABSTRACT

A flat gun spring for hand guns in which a rib is formed in the spring extending from the butt end of the spring toward the claw end. The longitudinal dimension of the rib extends a major portion of the spring. The depth of the rib progressively decreases from the butt end of the spring to the claw end of the spring. The progressively decreasing depth of the spring permits more energy to be stored in the spring during the early stages of hammer rotation and less energy in the later stages of hammer rotation. This eliminates "stack up" immediately prior to hammer release. The region of the spring closest to the claw end is arcuate and the width of the spring tapers from the butt end to the claw end. These factors further reduce stack up. The spring is formed with substantially constant thickness, and the rib is formed with substantially constant width.

4 Claims, 8 Drawing Figures

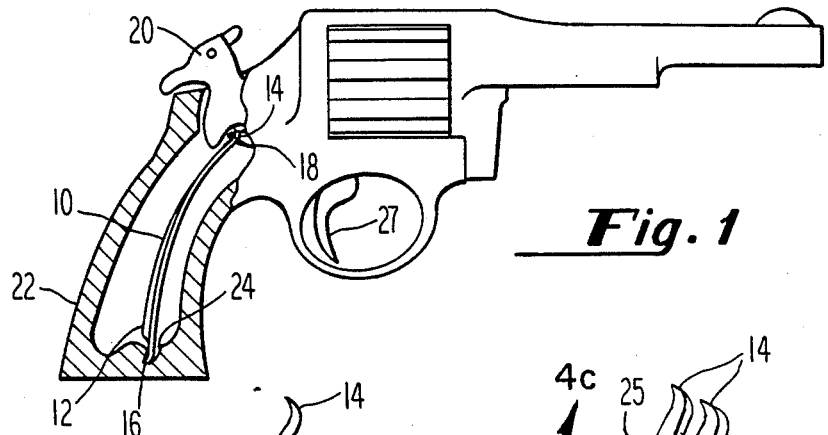
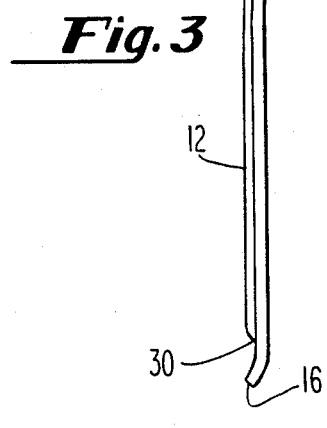
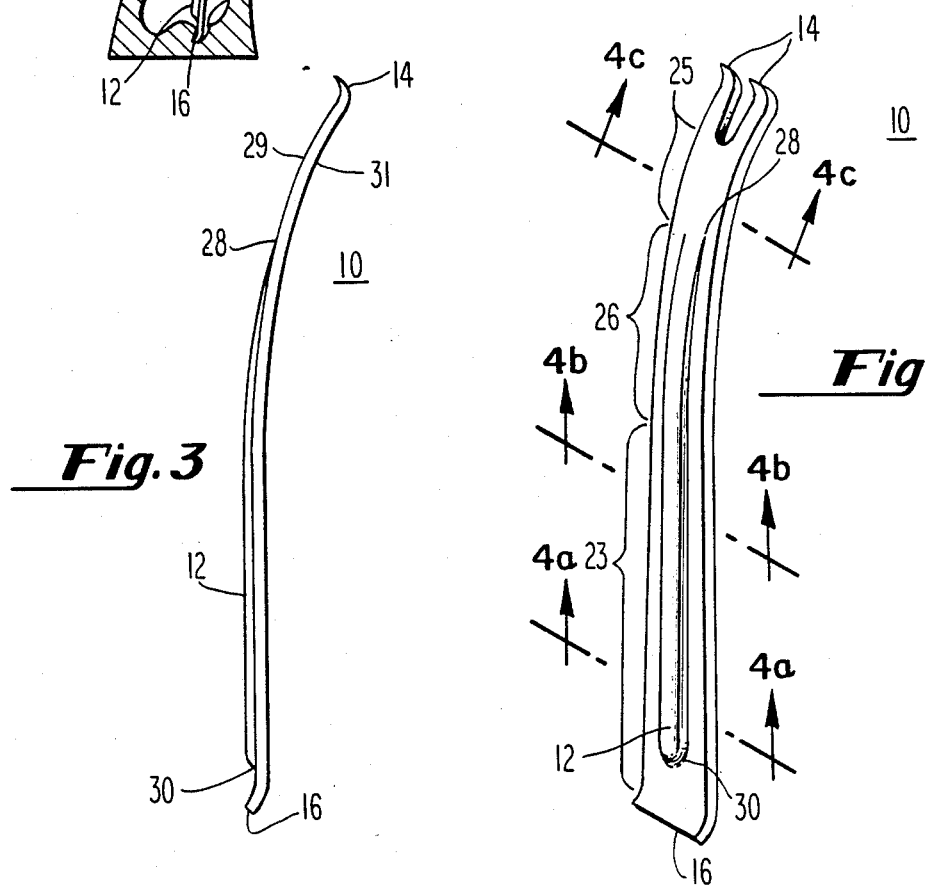
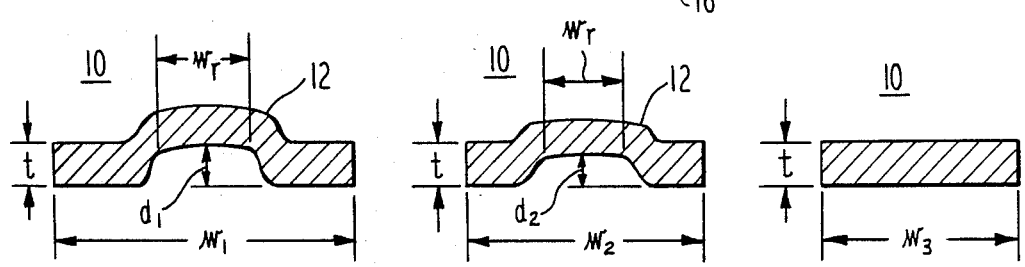
Fig. 1  Fig. 2  Fig. 3  Fig. 4a  Fig. 4b  Fig. 4c

VARIABLE POWER FLAT SPRING FOR REVOLVER-TYPE FIREARMS

This invention relates to the field of flat springs for firearms and more particularly to a hammer spring or main spring for revolver-type firearms.

BACKGROUND OF THE INVENTION

Known flat springs for revolver-type handguns are used to energize the hammer of a handgun for ignition purposes. These springs generally are substantially flat and are machined and milled or stamped to various geometric shapes in order to provide power output for the hammer. These springs generally provide a linear force function so that the operating force against the trigger is approximately linearly proportional to the hammer position measured in degrees of rotation. The force built up in the spring increases as the hammer is drawn back until the maximum hammer position is reached and the hammer is released. Thus there is a "stack up" period just before the hammer is released during which the force required to squeeze the trigger linearly increases to a level which may cause a shooter to pull off target.

Thus prior springs have left a lot to be desired with respect to a desired smoothness of operation. A smooth trigger pull would allow the shooter to smoothly pull back on the trigger until the hammer is released without a hesitation or "stack up" prior to release of the hammer.

One way that this problem was solved in the past was by using weaker springs. While the weaker springs also built up force linearly, the stacked up force at the end of the hammer travel was less. However the stacked up force at the end of hammer travel was less only because the spring was weaker. The stacked up force of the weaker springs was proportional to the stacked up force of the stronger springs because the force of the weaker springs also increased linearly as a function of hammer rotation. A disadvantage of a spring whose stacked up force was less because it was a weaker spring was a greater risk of misfire because the amount of energy pushing the hammer forward to ignite the cartridge was less.

Milling the cross section of the spring progressively thinner in the direction approaching the claw of the spring is a known method of decreasing stack up. While this method reduced stack up to some degree, it produced a weak point in the spring if the spring was milled enough to significantly reduce stack up because this spring was thinnest in the area where breakage was most likely to occur.

It is also known to taper springs in the direction moving from the butt to the claw providing a non-linear force curve to decrease stackup. Tapering causes the force curve of the spring to be somewhat non-linear allowing more energy to be stored during the early stages of hammer rotation and less stack up closer to hammer release. An example of a handgun having such a spring may be found in the Smith and Wesson Highway Patrolman Revolver Model No. 28.

SUMMARY OF THE INVENTION

A flat gun spring for hand guns in which a rib is formed in the spring extending from the butt end of the spring toward the claw end. The longitudinal dimension of the rib extends a major portion of the spring. The depth of the rib progressively decreases from the butt end of the spring to the claw end of the spring. The progressively decreasing depth of the spring permits more energy to be stored in the spring during the early stages of hammer rotation and less energy in the later stages of hammer rotation. This eliminates "stack up" immediately prior to hammer release.

BRIEF DESCRIPTION OF THE FIGURES

FIG. 1 shows the spring of the present invention in a revolver.

FIG. 2 shows a perspective view of the spring of FIG. 1.

FIG. 3 shows a side view of the spring of FIG. 1.

FIGS. 4a–4c show cross sections of the spring of FIG. 2.

DETAILED DESCRIPTION OF THE INVENTION

Figure 5:
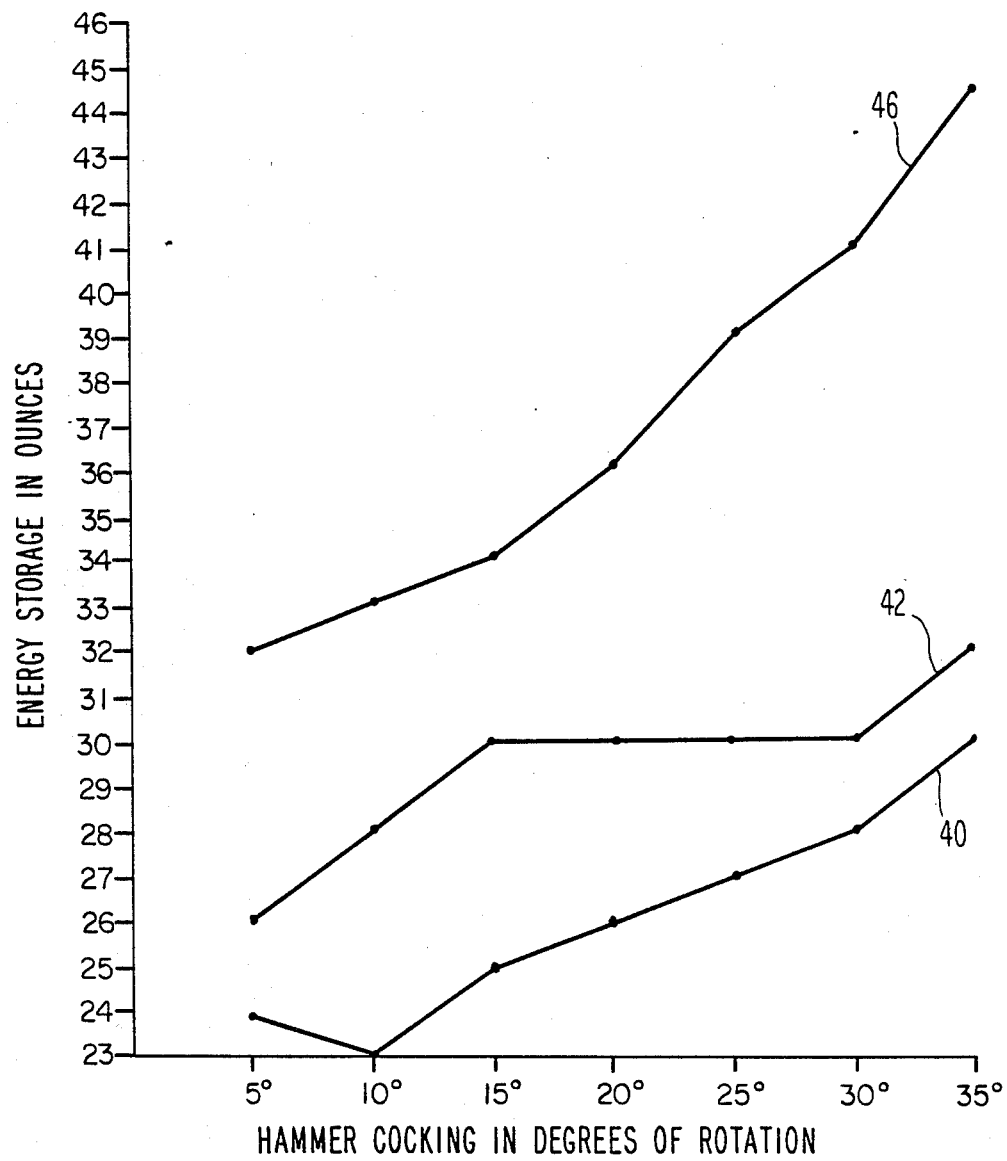
FIG. 5 shows a graph of energy storage in ounces versus hammer cocking in degrees of rotation for a plurality of springs.

Referring now to FIGS. 1–3, leaf or flat spring 10 for igniting cartidges in a hand gun is shown. Flat spring 10 comprises substantially flat ribbed region 23, ribbed arcuate region 26, and unribbed region 25 and has a butt end 16 and a claw end 14. Flat spring 10 has a constant cross-sectional thickness and, in the direction from butt end 16 to claw end 14, a tapering width. Flat spring 10 also has variable power rib 12 which progressively decreases in depth in the longitudinal direction from butt end 16 of spring 10. Rib 12 has a substantially constant width throughout its longitudinal extension. Rib 12 increases the tension required to bend portions of spring 10 in proportion to the depth of rib 12 thereby causing progressively more energy to be stored in the regions of spring 10 having greater rib depth. Variable power rib 12 is formed by producing a longitudinal depression in spring 10 from compression side 31 of spring 10 to tension side 29. Additionally, spring 10 is progressively more arcuate in the direction from ribbed arcuate region 26 through unribbed arcuate region 25.

As trigger 27 is squeezed toward butt 22, hammer 20 is moved from its rest position to its release position, a rotation of approximately thirty to thirty-five degrees. As hammer 20 rotates toward its fully cocked release position, stirrup 18, received by claw 14 of spring 10, is advanced in the direction away from butt 22. Flange-shaped butt end 16 of flat spring 10 is secured in notch 24 of stock 22 causing spring 10 to bend as claw end 14 is drawn forward. It is believed that because the depth of rib 12 is greater towards rib end 30, the bending of ribbed substantially flat region 23 of spring 10 stores progressively more energy than the bending of ribbed arcuate region 26 and that the bending of ribbed arcuate region 26 stores progressively more energy than the bending of unribbed arcuate region 25. Approximately two-thirds of the total energy stored by spring 10 is stored in the region of spring 10 below arcuate portion 25 during the first five to fifteen degrees of hammer rotation.

Region 23 is substantially flat in the longitudinal direction before being installed in stock 22. However, when spring 10 is positioned within stock 22, region 23 of spring 10 is caused to bend slightly. Thus, spring 10 is somewhat pre-loaded when hammer 20 is at its rest position. In an alternate embodiment (not shown) region 23 may be formed with a slight curve when spring 10 is untensed.

As hammer 20 continues to rotate past fifteen degrees, the higher resistance regions of spring 10, where rib 12 is deeper and where spring 10 is less arcuate, are progressively more difficult to bend. It is believed that when the higher resistance regions substantially stop bending, the lower resistance regions of spring 10 begin to bend. The lower resistance regions are weaker because rib 12 has a decreasing depth as it extends into ribbed arcuate region 26 and is completely absent in arcuate region 25 and because the width of spring 10 tapers in the direction from butt end 16 to claw end 14.

Additionally, spring 10 is progressively more arcuate starting from the boundary of region 26 and region 23 through the length of region 25. It is believed that the greater arcing of unribbed arcuate region 25 as compared with ribbed arcuate region 26 causes the force required to bend unribbed arcuate region 25 to be very small with respect to the force required to bend the regions of spring 10 having a progressively deeper rib 12.

Thus as unribbed arcuate region 25 bends, very little additional force is required for the remaining rotation of hammer 20 from fifteen degrees to slightly beyond thirty degrees at which point hammer 20 is released to detonate the cartridge. Therefore, the amount of force required to be applied to trigger 27 at rotation angles of hammer 20 beyond fifteen degrees remains substantially constant, thereby preventing stack up.

Referring now to FIGS. 4a–c, it is understood that the transverse cross-sectional views of spring 10 shown are approximate representations of spring 10 at indicated points and that an actual spring 10 may vary from the representations shown in minor details. FIG. 4a shows a cross section of spring 10 taken at a point in region 23 substantially above end 30 of rib 12. At this point, spring 10 has a thickness t and a transverse width $w_1$, and rib 12 has a depth $d_1$ and a rib width $w_r$. FIG. 4b shows a cross section of spring 10 taken between ends 28,30 of rib 12. At this point spring 10 still has a thickness of t and rib 12 still has a width $w_r$. Thus spring 10 has a constant thickness and rib 12 has a constant width. However, rib 12 has a depth $d_2$, in which $d_2 < d_1$ because the depth of rib 12 decreases in the direction from rib end 30 to rib end 28. Additionally, spring 10 has a width $w_2$ in which $w_2 < w_1$ because the width of spring 10 decreases in the direction from butt end 16 to claw end 14.

FIG. 4c shows a cross section of spring 10 taken at a point within unribbed arcuate region 25 substantially above end 28 of rib 12. At this point, spring 10 has a thickness t, and thus a constant cross section throughout its entire length, and a width $w_3$, in which $w_3 < w_2$ because spring 10 continues to taper in unribbed arcuate region 25. Rib 12 does not extend into arcuate region 25 of spring 10.

Referring now to FIG. 5, there is shown a graph of the angle of rotation of hammer 20 on the horizontal axis versus the static energy storage in ounces on the vertical axis for a plurality of test springs. The energy storage in ounces is a static measurement of the force required against hammer 20 to cause hammer 20 to remain stationary against a spring at a given angle of rotation. The energy storage was measured removing all internal parts of a handgun, exept a hammer and spring, and coupling a connecting rod to the hammer and a scale. It is believed that the scale could thus measure the force applied to the hammer to an accuracy of one ounce.

Curve 46 shows energy storage in ounces as a function of hammer cocking in degrees of rotation for a conventional factory mainspring (not shown) such as that used in Smith and Wesson K,L,N frame revolvers. As hammer cocking degrees increase from five degrees to fifteen degrees, curve 46 shows an increase in static energy storage from thirty-two to thirty-four ounces, an increase of two ounces. As hammer cocking increases from fifteen degrees to thirty degrees, curve 46 shows the static energy storage of the factory mainspring increasing from thirty-four ounces to forty-one ounces, an increase of seven ounces.

This interval, between fifteen degrees and thirty degrees, is the interval in which energy stack up occurs. As trigger 27 causes hammer 20 to rotate from fifteen degrees to thirty degrees, the stack up of energy which must be supplied to trigger 27 by a shooter increases by approximately seven ounces. The requirement that this much extra energy be supplied may be responsible for causing a hand gun to be pulled offtarget just prior to the release of hammer 20 which occurs between thirty degrees and thirty-five degrees.

Curve 42 illustrates the relationship between hammer cocking in degrees of rotation and the energy storage of spring 10. As hammer 20 rotates from five degrees to fifteen degrees, the static energy storage of spring 10 increases from twenty-six ounces to thirty ounces. This is an increase of four ounces, double the increase of two ounces which is required to rotate the factory mainspring of curve 46 from five degrees to fifteen degrees. Thus spring 10 stores more energy in the early stages of hammer rotation than the convention factory mainspring.

As spring 10 is bent by rotation of hammer 20 from fifteen degrees to thirty degrees, the static energy storage in spring 10 remains substantially constant at thirty ounces rather than increasing linearly in a manner similar to the spring of curve 46. It is believed that in this interval unribbed arcuate region 25 bends, offering much less resistance than the ribbed regions offer when they bend. Thus, the large energy stack up of the factory spring of curve 46 prior to the release of hammer 20 is not present. The increase in static energy storage in spring 10 between fifteen degrees and thirty degrees is zero within the measurement accuracy of the instruments used as compared with the increase of seven ounces required to between fifteen degrees and thirty degrees for the factory mainspring of curve 46.

Curve 40 shows the relationship between hammer cocking in degrees of rotation and static energy storage in a test spring (not shown) identical to spring 10 except for the absence of variable power rib 12. Thus curve 40 may be used to illustrate the effect of rib 12 on stack up. As hammer cocking in degrees of rotation increases from fifteen degrees to thirty degrees in curve 40, the static energy storage increases from twenty-five ounces to twenty-eight ounces, a difference of three ounces as compared with an increase of zero during this interval for spring 10 having rib 12 as shown in curve 42.

Thus the ability of spring 10 to cause most of the energy storage to occur during the rotation of hammer 20 prior to fifteen degrees and then allow the remaining rotation to occur without any measured increase in static energy storage may be seen to be a result of variable power rib 12 which decreases in depth in the direction from rib end 30 to rib end 28. The increasingly arcuate shape of spring 10 and the tapering of spring 10 in the direction of claw end 14 are believed to contribute advantageously to this effect in addition to variable power rib 12.

Figure 6:
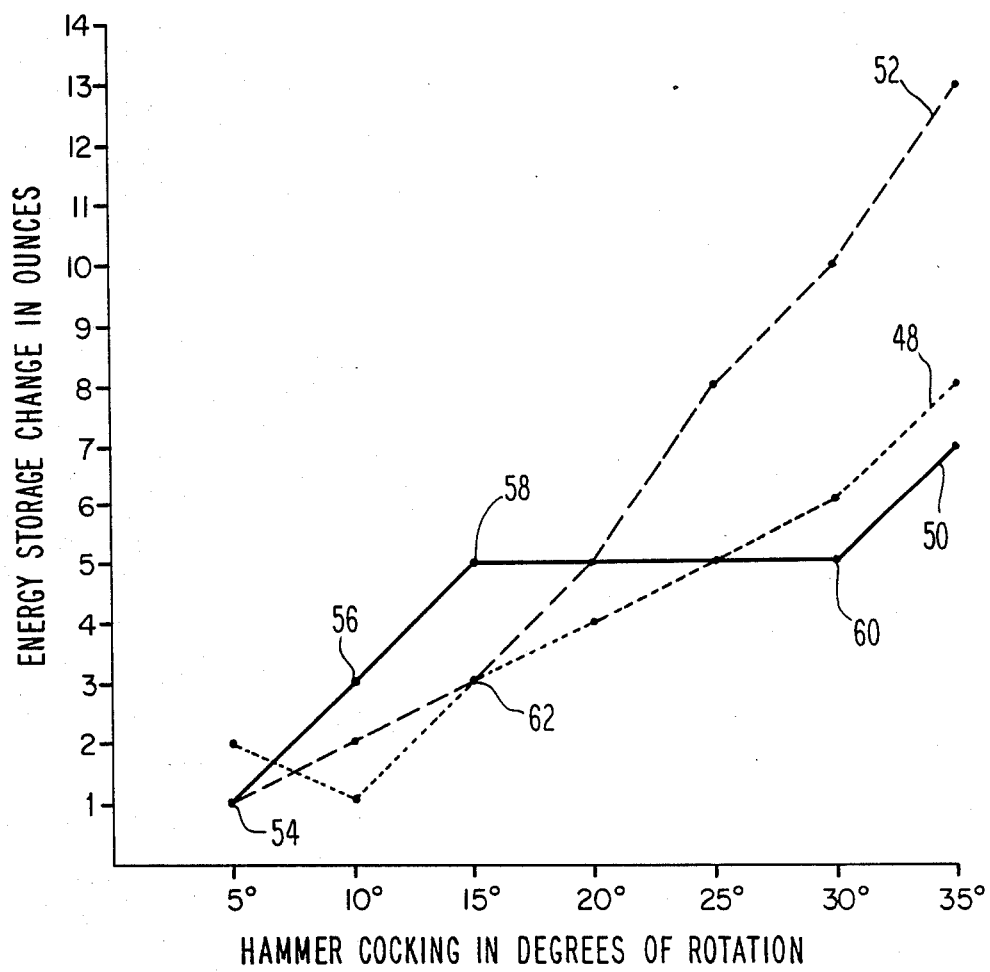
FIG. 6 shows a graph of energy storage change in ounces versus hammer cocking in degrees of rotation for the springs in FIG. 5

Referring now to FIG. 6, there is shown a graph of the change in static energy storage versus the hammer cocking in degrees of rotation for a plurality of springs, containing the same information as the graph of FIG. 5 but arranged in a manner to superimpose the force curves to permit further comparison. Curves 48,50,52 are normalized such that the curve of spring 10, curve 50, begins at one ounce on the vertical axis.

As hammer 20 rotates from five degrees to ten degrees, the energy storage in spring 10 increases from twenty-six ounces to twenty-eight ounces, a change of two ounces. Therefore, points 54,56 of curve 50 show a change of two ounces from one ounce to three ounces as hammer rotation increases from five degrees to ten degrees. As hammer 20 rotates from ten degrees to fifteen degrees, the static energy storage of spring 10 increases from twenty-eight ounces to thirty ounces. Therefore, points 56,58 show an increase of two ounces, from three ounces to five ounces. As hammer 20 is rotated from fifteen degrees to thirty degrees, spring 10 stores substantially no additional static energy. Therefore, points 58,60 of curve 50 are both at five ounces indicating no measurable static energy storage change. Thus the energy storage between fifteen degrees and thirty degrees is constant for spring 10 rather than linearly increasing.

Curves 48,52 illustrate the relationship between the energy storage change and the hammer cocking in degrees of rotation for the spring similar to spring 10 but without variable power rib 12 as described with respect to curve 40 and for the factory mainspring of curve 46 respectively. For example, as the factory mainspring is bent by hammer 20 rotating from fifteen degrees to thirty degrees, the energy stored increases from thirty-four ounces to forty-one ounces as seen in curve 46. This is an increase of seven ounces. Therefore, the distance along the energy storage change axis increases by seven ounces for curve 52, from three ounces to ten ounces. As seen by curve 52, this increase is a substantially linear increase in the range in which spring 10 displays a constant energy storage rather than an increase.

It is claimed:

1. A leaf spring for the hammer of a handgun, said spring having a lower butt end and an upper claw end for connection with the hammer, said spring having a tensile-stress face and a compression face, said spring having a rib projecting from the tensile-stress face and forming a channel in the compression face of said spring, said rib and channel extending from near the butt end toward but terminating short of said claw end, said channel having a maximum depth at the butt end and progressively decreasing in depth toward the claw end, whereby during early stages of hammer withdrawal, the potential energy stored in said spring represents a major portion of the total potential energy stored during a complete hammer withdrawal with substantially less potential energy being stored during later stages of hammer withdrawal, thereby to substantially decrease stack-up just prior to hammer release.

2. A leaf spring according to claim 1 wherein the body of said spring is arcuate at the claw end.

3. A leaf spring according to claim 1 wherein said rib and channel are of substantially constant width.

4. A leaf spring according to claim 1 or 3 wherein the body of said leaf spring is of substantially constant thickness.

* * * * *